United States Patent [19]

Scott

[11] Patent Number: 4,514,117
[45] Date of Patent: Apr. 30, 1985

[54] QUICK-CHANGE TOOL HOLDER AND TOOL

[76] Inventor: Larry Scott, 2821 Eagle Dr., Fort Collins, Colo. 80526

[21] Appl. No.: 377,889

[22] Filed: May 14, 1982

Related U.S. Application Data

[63] Continuation-in-part of Ser. No. 271,394, Jun. 8, 1981, abandoned.

[51] Int. Cl.³ .............................................. B23B 31/10
[52] U.S. Cl. .................................. 408/239 R; 279/77
[58] Field of Search ...................... 408/239 A, 239 R; 279/77, 1 A

[56] References Cited

U.S. PATENT DOCUMENTS 799,787 9/1905 Gessert .................................. 279/77

FOREIGN PATENT DOCUMENTS

| 1380 | 12/1877 | Fed. Rep. of Germany | 279/77 |
| 86413 | 9/1920 | Switzerland | 279/77 |
| 3154 | of 1885 | United Kingdom | 279/77 |

Primary Examiner—William R. Briggs
Attorney, Agent, or Firm—Townsend and Townsend

[57] ABSTRACT

A holder is provided for attaching a tool, having a tapered end and a flat driven face on the end, to a rotary drive, such as a drill. The holder has a body with a bore coaxial with the rotary axis. The bore is tapered at one end for slidably receiving the tapered tool end and typically is threaded at the other end for receiving the threaded end of an adapter. The other end of the adapter has six sides for attaching the tool holder to the drill. A flat driving face is provided at the tapered bore for engaging a complementary driven face formed in the tapered end of the tool. The tool is secured axially within the tapered bore by a latch element which extends into the tapered bore to engage a recess in the tapered end of the tool. The latch element can be a pivotal latch plate mounted for movement in a radial plane or a radially extending detent assembly. The latch element can also be magnetic.

1 Claim, 12 Drawing Figures

U.S. Patent  Apr. 30, 1985  Sheet 1 of 3  4,514,117
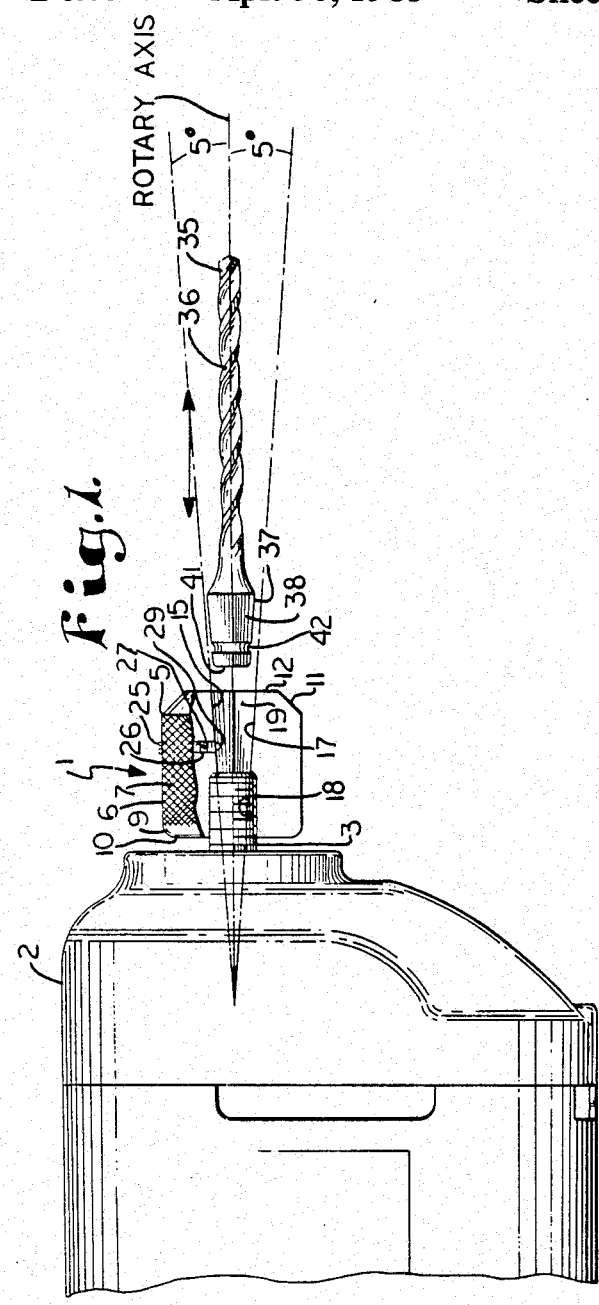
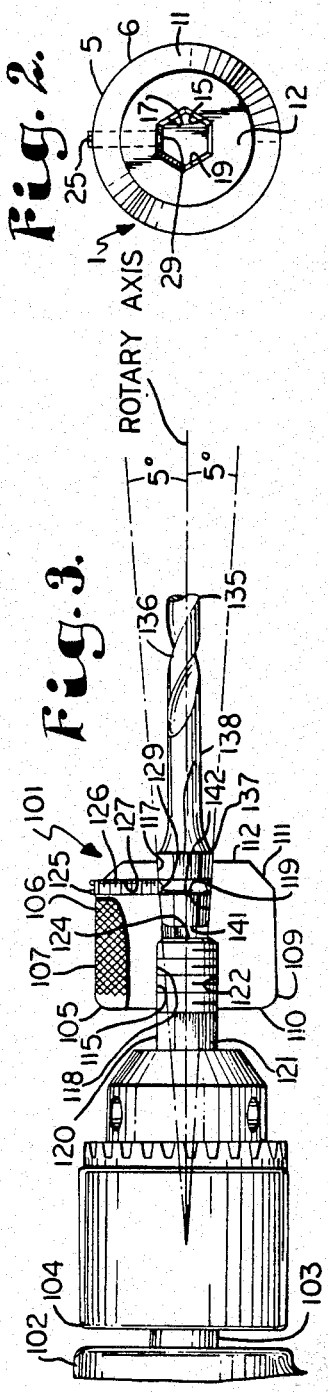
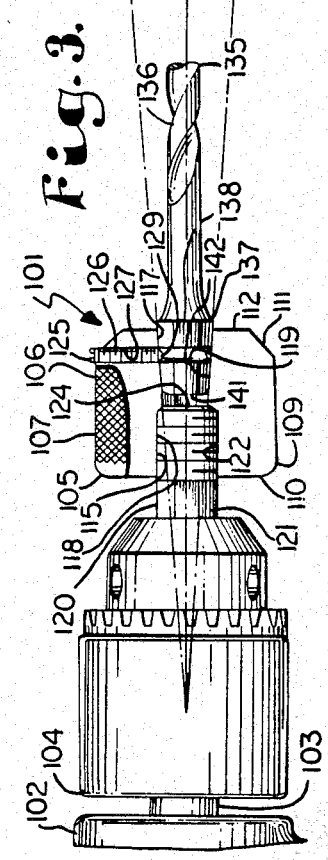

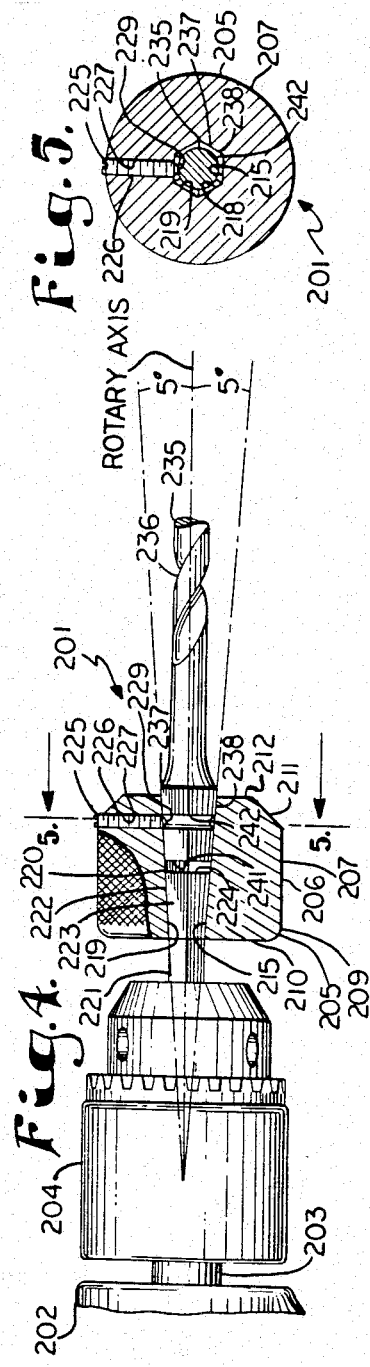
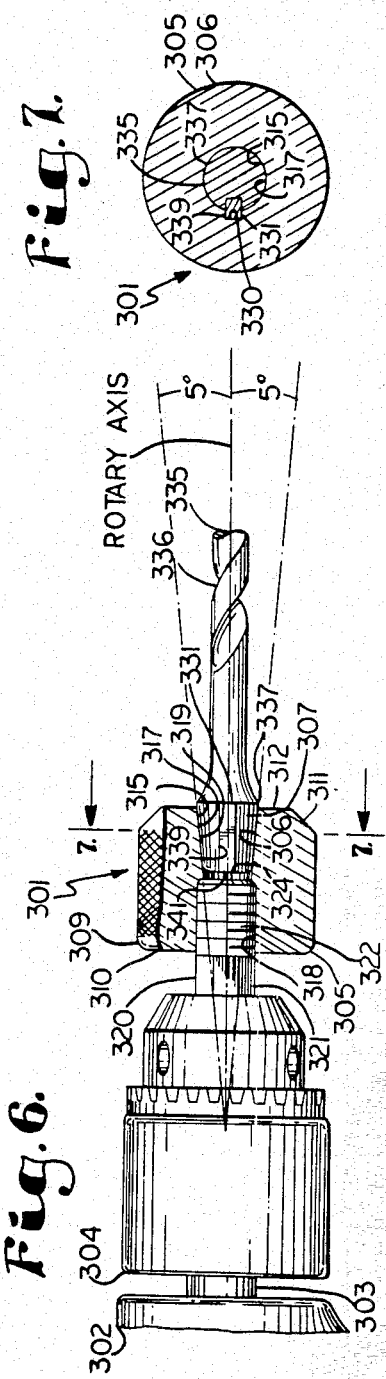

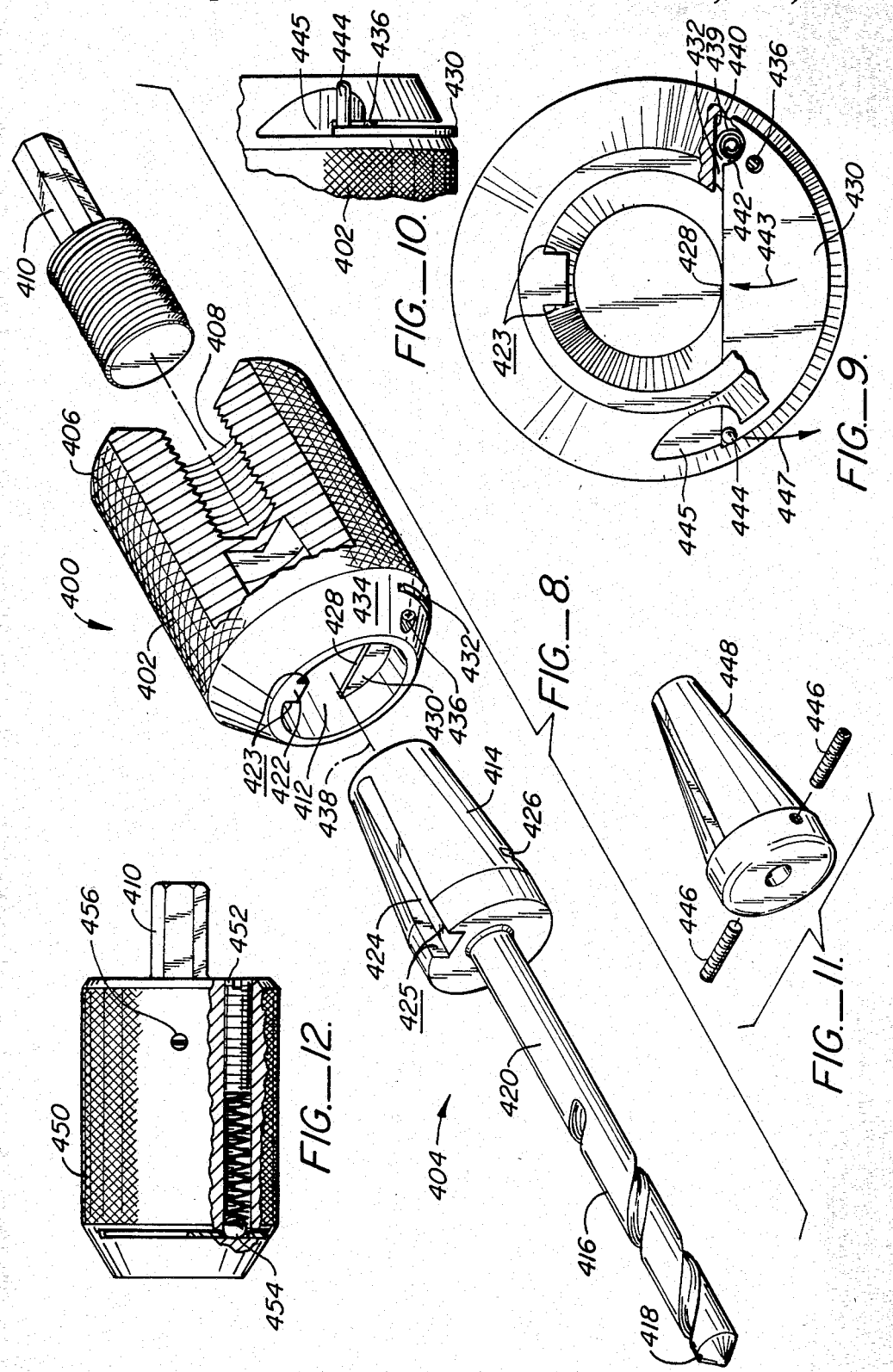

QUICK-CHANGE TOOL HOLDER AND TOOL

This is a continuation-in-part of my earlier filed U.S. patent application Ser. No. 271,394 filed on June 8, 1981 now abandoned.

BACKGROUND OF THE INVENTION

This invention relates to tool holders, and in particular to a quick-change holder for attaching drill bits and the like to rotating means, such as hand-held drills and drill presses.

Quick-change tool holders and chucks are well-known in the field of tools, and a variety of different designs have been developed in an attempt to achieve a system whereby different drill bits and the like may be quickly and easily inserted in a respective tool holder or chuck, locked against relative rotation with respect thereto and accurately aligned on a rotary axis of the drill or rotating machine tool. A well-known type of drill chuck with gripping jaws for retaining a tool shank requires a separate chuck key for rotating a sleeve relative to the chuck and thereby adjusting the jaws. However, the dependency of such chucks on separate chuck keys for loosening and tightening substantially impairs their convenience of operation. First of all, the key must be twisted in a receiver for both loosening and tightening the drill chuck, thereby requiring two separate additional operations with the key for changing a drill bit. Secondly, the separate chuck keys are prone to being lost or misplaced, whereby the drill may be rendered substantially inoperative. A third disadvantage with respect to requiring separate keys is that such keys are not necessarily interchangeable between different drill chucks. Finally, maximum effective gripping force on a drill bit is obtained with such chucks by sequentially placing the key in each separate receiver and twisting it whereby each respective gripping jaw is tightened. However, this procedure is frequently not followed and the drill bits are thereby out of alignment with the rotary axis of the drill and subject to slippage, scoring, and inaccurate drilling.

Several quick-change drill chucks have been designed in an attempt to achieve positive attachment of a drill bit to a drill without dependence upon a chuck key. Several of these chucks include collets or adaptors within which the drill bit shank is retained and which are then inserted into a chuck or tool holder attached to a drill or other rotating machine tool. For example, see the Poutie U.S. Pat. No. 2,370,487 wherein a tapered collet receives a drill bit and is tightened thereagainst by a chuck nut threadably engaging the collet. This assembly may then be inserted into an adaptor and retained therein by a ball plunger. However, for quickly changing different sizes of drill bits with such a device a separate collet and chuck nut are required for each drill bit. Also, relative rotation between the drill bit and the adaptor is prevented only by a friction engagement of the drill bit within a slot in the collet.

Keyless chucks have also been developed which utilize gripping elements radially moveable with respect to a drill bit similar to key-type drill chucks. See for example the Vogel U.S. Pat. No. 4,252,333 wherein a control sleeve moves axially with respect to a cylindrical body in response to relative rotation therebetween, whereby gripping elements positioned in a tapered bore tighten or loosen radially with respect to a drill bit shank. However, slippage of the drill bit relative to such a chuck may occur if the gripping elements are not sufficiently tightened. Also, tightening such keyless chucks about respective drill bits is generally more difficult than with key-type chucks wherein the chuck key provides additional leverage for tightening the chuck.

In addition to their aforementioned disadvantages, prior art quick change took holders and drill chucks also tended to be complex, either in structure or in manufacture, necessitating a relatively high cost to the user.

OBJECTS OF THE INVENTION

Therefore, the objects of the present invention are: to provide a tool holder for quickly attaching and detaching tools to drills and the like; to provide such a tool holder which accurately aligns the tool with the rotary axis of the drill; to provide such a tool holder which positively locks the tool against relative rotation with respect to the drill; to provide such a tool holder which receives and secures drill bits and the like without the use of a chuck key; to provide such a tool holder which includes a bore for slidably receiving a tool shank; to provide such a tool holder which includes a flat face on the bore for engaging a flat face on the tool shank; to provide such a tool holder which includes a key extending into the bore and into a keyway on the tool shank; to provide such a tool holder which includes latch plate means for retaining the tool shank within the tool holder bore; to provide such a tool holder with a bore which includes a first tapered portion of the bore for receiving a tapered drill bit shank and a second threaded portion of the bore for receiving a spindle attached to a drill or the like; and to provide such a tool holder which is economical to manufacture, efficient in use, capable of long operating life, and particularly well adapted for the proposed use.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

SUMMARY OF THE INVENTION

A tool holder is provided for attaching a tool having a shank to means for rotating the tool about a rotary axis. The tool holder includes a body member having a bore extending coaxially with the rotary axis. The tool shank is slidably received in the bore. In one embodiment a bore extends through the body member and includes a tapered first portion with a flat face. The tool shank is correspondingly tapered and includes a flat face for mutual engagement with the bore flat face. A spring plunger extending into the bore first portion engages an annular groove around the tool shank for retaining the tool shank in the bore. The bore includes a threaded second portion which receives either a threaded spindle extending from a drill or a threaded portion of a shaft which may be secured in a conventional key-type drill chuck.

In an alternative embodiment the tool shank is provided with a keyway which slidably receives a key mounted on the body member and extends into the bore thereof. The key is magnetic and the drill shank comprises a ferromagnetic material whereby the tool shank is retained within the body member bore.

A further alternative embodiment uses a latch plate pivotally mounted to the tool holder for movement in a radially oriented plane. The inner edge of the latch plate extends partially into the bore in the tool holder to engage a groove or slot in the base of the tool assembly.

The drawings constitute a part of this specification and include exemplary embodiments of the present invention and illustrate various objects and features thereof.

BRIEF DESCRIPTION OF THE DRAWINGS

FIG. 1 is a side elevational view of a tool holder representing a preferred embodiment of the present invention, shown attached to a drill, with portions thereof broken away to reveal internal construction.

FIG. 2 is an enlarged, front elevational view of the tool holder.

FIG. 3 is an enlarged, side elevational view of a tool holder representing a second embodiment of the present invention, shown attached to a conventional key-type chuck of a drill and with a drill bit inserted therein, with portions thereof broken away to reveal internal construction.

FIG. 4 is an enlarged, side elevational view of a tool holder representing a third embodiment of the present invention, with portions thereof broken away to reveal internal construction.

FIG. 5 is an enlarged, vertical cross-sectional view of the third embodiment taken along line 5—5 in FIG. 4.

FIG. 6 is an enlarged, side elevational view of a tool holder representing a fourth embodiment of the present invention, with portions thereof broken away to reveal internal construction.

FIG. 7 is an enlarged, vertical cross-sectional view of the fourth embodiment taken along line 7—7 in FIG. 6.

FIG. 8 is an exploded isometric view of a fifth embodiment of the invention.

FIG. 9 is an enlarged front view of the tool holder of FIG. 8 with portions broken away showing the latch plate.

FIG. 10 is a partial side view of the embodiment of FIG. 8 showing the pin extending from the latch plate.

FIG. 11 shows an alternative embodiment of the base of the tool bit assembly of FIG. 8 for use with removable drill bits.

FIG. 12 is a side view of a sixth embodiment of the invention similar to the embodiment of FIG. 8 but using a detent assembly to secure the latch plate in a locked position.

DETAILED DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

For purposes of description herein, the terms "front", "rear", and derivatives thereof shall relate to the right and left sides, respectively, of the tool holder as oriented in FIGS. 1, 3, 4, and 6, for the respective embodiments of the present invention depicted therein. However, it is to be understood that the invention may assume various alternative orientations, except where expressly specified to the contrary.

Referring to the drawings in more detail, the reference numeral 1 (FIGS. 1 and 2) generally designates a tool holder embodying the present invention for attachment to rotary means such as an electric drill 2 with a threaded rotating spindle 3 extending therefrom coaxially with a rotary axis of the drill 2. The tool holder 1 comprises a body member 5 having a cylinder-shaped portion 6 with a knurled outer surface 7. The body member 5 also includes a rear portion 9 with a rear face 10 and a frusto-conical front portion 11 with a front face 12.

A bore 15 extends through the body member 5 coaxially with the drill 2 rotary axis and includes a tapered first portion 17 opening onto the body member front face 12 and a threaded second portion 18 opening onto the body member rear face 10. The bore first portion 17 comprises six tapered, rearwardly converging flat faces 19 forming a hexagon-shaped cross-sectional configuration as shown in FIG. 2. Each bore first portion flat face 19 extends longitudinally along a line angled at approximately five degrees from the rotary axis of the electric drill 2.

A detent assembly 25 extends inwardly from the cylinder-shaped portion outer surface 7 through the body member 5 and into the bore first portion 17. The detent assembly 25 includes a sleeve 26 threadably engaged in a threaded receiver 27 extending radially between the outer surface 7 and the bore first portion 17. A plunger 29 is partly positioned within the sleeve 26 and is slidably urged outwardly therefrom and into the bore first portion 17 by a helical spring (not shown) positioned in the sleeve 26. The tool holder 1 is adapted for removably attaching a drill bit 35 to the electric drill 2. The drill bit 35 includes a cutting portion 36 and a tapered shank 37. The tapered shank 37 comprises six tapered, rearwardly converging flat faces 38 forming a hexagon-shaped cross-sectional configuration and conforming to the configuration of the body member bore first portion 17. Each tapered shank flat face 38 extends longitudinally along a line angled at approximately five degrees from a rotary axis of the drill bit 35. The drill bit 35 also includes a rear end 41 and an annular groove 42 in spaced relationship between the rear end 41 and the cutting portion 36.

In operation with the electric drill 2, if a key-type chuck is attached to the electric drill 2, it is unscrewed from the threaded spindle 3. The body member 5 is then screwed onto the spindle 3 which is received within the threaded second portion 18 of the bore 15. The drill bit 35 is then attached to the body member 5 by inserting the drill bit tapered shank 37 into the tapered first portion 17 of the bore 15 until the tapered flat faces 19 and 38 of the bore first portion 17 and the tapered shank 37 respectively engage tightly in abutting, mutually opposing relationship. The spindle 3 and the drill bit rear end 41 are maintained in spaced relationship whereby the drill bit shank 37 may be inserted into the bore tapered first portion 17 until the corresponding tapered configurations of the abutting bore flat faces 19 and the shank flat faces 38 prevent further insertion.

With the tapered shank 37 extending into the bore first portion 17 as far as their respective tapers will permit, the plunger 29 of the detent assembly 25 is aligned with the annular groove 42 encircling the tapered shank 37, and is urged inwardly into the annular groove 42 by the helical spring (not shown) within the detent assembly sleeve 26 whereby the drill bit 35 is securely attached to the body member 5.

The tight, engaging fit between the tapered bore first portion 17 and the tapered shank 37 provides a positive alignment of the drill bit cutting portion 36 along the rotary axis of the electric drill spindle 3. Also, the mutually opposed abutting engagement between the bore first portion flat faces 19 and the tapered shank flat faces 38 provides a positive lock therebetween against relative rotation between the drill bit 35 and the boy member 5. For normal rotation of the spindle 3 in a clockwise direction when viewed from the rear of the electric drill 2, the torque transmitted thereby will tend to tighten the threaded engagement between the spindle 3 and the bore second portion 18, thereby preventing the tool holder 1 from being spun off of the electric drill 2 during use.

The reference numeral 101 (FIG. 3) generally represents a second embodiment of the invention for attachment to an electric drill 102 including a key-type chuck 104 mounted on a spindle 103 and coaxial therewith. The tool holder 101 comprises a cylinder-shaped portion 106 with a knurled outer surface 107, a rear portion with a rear face 110, and a frusto-conical front portion 111 with a front face 112. A bore 115 extends through the body member 105 and includes a tapered first portion 117 opening onto the body member front face 112 and a threaded second portion 118 opening onto the body member rear face 110. The bore first portion 117 comprises six tapered, rearwardly converging flat faces 119 defining a hexagonal cross-sectional configuration. Each bore first portion flat face 119 extends longitudinally along a line angled at approximately five degrees from a rotary axis of the electric drill 102.

An adaptor 120 coaxial with the rotary axis of the electric drill 102 connects the key-type chuck 104 and the body member 105 and includes a six-sided first portion 121 having a hexagon-shaped cross-sectional configuration and a threaded second portion 122. The adaptor first portion 121 is placed within gripping elements (not shown) of the chuck 104 and tightened therein with a conventional chuck key (also not shown). The adaptor second portion 122 is threadably engaged within the bore threaded second portion 118.

The tool holder 101 includes a detent assembly 125 having a sleeve 126 threadably engaged within a threaded receiver 127 which extends radially through the body member 105 between its outer surface 107 and the bore tapered first portion 117. A plunger 129 is partly positioned within the sleeve 126 and urged outwardly therefrom by a helical spring (not shown) into the bore tapered first portion 117.

A drill bit 135 comprising a cutting portion 136 and a tapered shank 137 with six tapered, rearwardly converging flat faces 138 is removably attached to the tool holder 101. Each tapered shank flat face 138 extends longitudinally along a line angled at approximately five degrees from a rotary axis of the drill bit 135. The tapered shank 137 has a hexagonal cross-sectional configuration corresponding to that of the bore first portion 117. When the drill bit tapered shank 137 is slidably inserted into the bore tapered first portion 117 as shown in FIG. 3, the bore flat faces 119 and the respective drill bit flat faces 138 engage tightly in mutually abutting relationship, whereby the cutting portion 136 of the drill bit 135 is centered within the tool holder 101 coaxial with the rotary axis of the electric drill 102.

The tapered shank 137 includes a rear end 141 and is encircled by annular groove 142 spaced forward of the rear end 141. The annular groove 142 receives the plunger 129 of the detent assembly 125 when the drill bit tapered shank 137 is properly inserted into the bore tapered first portion 117 for tight engagement therewith. The adaptor front end 124 and the drill bit rear end 141 are maintained in spaced relationship whereby the drill bit shank 137 may be inserted into the tapered bore 115 until the corresponding tapered configuration of the abutting bore flat faces 119 and the shank flat faces 138 prevent further insertion.

The adaptor 120 allows the tool holder 101 embodying the present invention to be used in conjunction with electric drills such as that designated 102 having key-type chucks 104 attached thereto. In the practice of the present invention, this is significant because with many electric drills such as that shown at 102, their respective key-type chucks such as that shown at 104 are not readily removable.

The reference numeral 201 (FIGS. 4 and 5) generally represents a third embodiment of the present invention attached to an electric drill 202 having a conventional key-type chuck 204 attached thereto by a rotary spindle 203. The tool holder 201 comprises a body member 205 having a cylinder-shaped portion 206 with a knurled outer surface 207, a rear portion 209 with a rear face 210 and a frustoconical front portion 211 with a front face 212.

A tapered bore 215 extends through the body member 205 between its rear and front faces 210 and 212 respectively. The bore 215 is defined by six tapered, rearwardly converging flat faces 219 and has a hexagonal cross-sectional configuration. Each bore first portion flat face 219 extends longitudinally along a line angled at approximately five degrees from the rotary axis of the electric drill 202.

The body member 205 is connected to the key-type chuck 204 by an adaptor 220 including a first portion 221 partly received within the gripping elements (not shown) of the key-type chuck 204 and secured therein by tightening the gripping elements against the adaptor first portion 221 by means of a chuck key (also not shown). The adaptor first portion 221 comprises six flat faces 223 and has a hexagonal cross-sectional configuration. The adaptor 220 includes a tapered second portion 222 with six tapered, rearwardly-converging flat faces 224 and a hexagonal cross-sectional configuration. Each adaptor flat face 224 extends longitudinally along a line angled at approximately five degrees from a rotary axis of the adaptor 220. The bore flat faces 219 tightly engage respective adaptor second portion flat faces 223 in mutually opposed abutting relationship. The adaptor 220 includes a front end 224 positioned within the bore 215.

A detent assembly 225 is positioned within the body member 205 and includes a sleeve 226 threadably engaged in a threaded receiver 227 extending from the body member outer surface 207 to the bore 215. A plunger 229 is partly positioned within the sleeve 226 and is urged outwardly therefrom by a helical spring (not shown) positioned within the sleeve 226 and into the bore 215.

The tool holder 201 is adapted for attaching to the electric drill 202 a drill bit 235 including a cutting portion 236 and a tapered shank 237. The tapered shank 237 includes six tapered flat faces 238 converging rearwardly to a tapered shank rear end 241. Each tapered shank flat face 238 extends longitudinally along a line angled at approximately five degrees from a rotary axis of the drill bit 235. The tapered shank flat faces 238 correspond to the configuration of the bore flat faces 219 whereby a tight, mutually opposed abutting engagement is maintained therebetween when the drill bit tapered shank 237 is positioned within the bore 215.

The drill bit tapered shank 237 is encircled by an annular groove 242 spaced forwardly of the rear end 241. The annular groove 242 is aligned with the detent assembly plunger 229 when the drill bit tapered shank 237 is properly inserted into the bore 215. The adaptor front end 224 and the drill bit rear end 241 are maintained in spaced relationship whereby the drill bit shank 237 may be inserted into the tapered bore 215 until the corresponding tapered configurations of the abutting bore flat faces 219 and the shank flat faces 238 prevent further insertion. Thus positioned and retained by the plunger 229 extending into the annular groove 242, the drill bit 235 is securely attached to the tool holder 201 coaxial with the rotary axis of the electric drill 202. The corresponding hexagonal cross-sectional configuration of the tapered bore 215 and the tapered shank 237 prevent relative rotation between the tool holder 201 and the drill bit 235.

The tool holder 201 of the third embodiment of the present invention has several advantages. First of all, simplicity of manufacture is achieved because the tapered bore 215 may be broached as a single operation because its tapered flat faces 219 extend continuously through the body member 205. Thus the additional manufacturing operation required to produce a bore having two separate portions, as with the previously described first and second embodiments, is eliminated. Secondly, the corresponding hexagonal cross-sectional configurations of the tapered bore 215 and the adaptor second portion 222 cooperate to prevent relative rotation between the chuck 204 and the tool holder 201, regardless of the direction in which the electric drill 202 is rotating. This is particularly significant for reversible drills, because a threaded engagement between any two elements thereof would be subject to unscrewing and disengagement when the drill is reversed.

After the tapered bore 215 is broached, the adaptor 220 is placed therein from the body member front face 212. The adaptor second portion 222 may then be secured to the body member 205 within the tapered bore 215 by any suitable means.

The reference numeral 301 (FIGS. 6 and 7) generally represents a fourth embodiment of the present invention attached to a conventional key-type chuck 304 connected to a rotary spindle 303 of an electric drill 302. The tool holder 301 comprises a body member 305 of non-magnetic material and having a cylinder-shaped portion 306 with an outer surface 307, a rear portion 309 with a rear face 310, and a frusto-conical front portion 311 with a front face 312.

A bore 315 extends through the body member 305 and includes a tapered first portion 317 opening onto the body member front face 312 and a threaded second portion 318 opening onto the body member rear face 310. The bore first tapered portion 317 converges rearwardly and has a frustoconical configuration. The frustro-conical bore first tapered portion 317 is angled at approximately five degrees from a rotary axis of the drill 302.

A keyway 330 opens into the bore tapered first portion 317 and includes a magnetized key 331 positioned and affixed therein as by being force fit. The keyway 330 and the key 331 are longitudinally aligned with respect to the rotary axis of the electric drill 302. The key 331 extends radially from the keyway into the bore first portion 317. An adaptor 320 connects the key-type chuck 304 and the body member 305 and includes a first portion 321 positioned within and secured by gripping elements (not shown) of the chuck 304. A threaded second portion 322 of the adaptor 320 is threadably received within the bore second threaded portion 318. The adaptor 320 includes a front end 324 positioned within the bore 315.

A drill bit 335 is removably attached to the tool holder 301 and includes a cutting portion 336 and a tapered shank 337. The tapered shank 337 has a frustroconical configuration corresponding to that of the bore tapered first portion 317 and a rear end 341. The frustroconical tapered shank 337 is angled at approximately five degrees from a rotary axis of the drill bit 335. A keyway 339 extends longitudinally with respect to the tapered shank 337 in a direction substantially parallel to the rotary axes of the electric drill 302 and the drill bit 335. The drill bit 335 comprises a ferromagnetic material whereby a magnetic attraction is effected between the drill bit 335 and the magnet key 331.

In operation, the tapered shank 337 of the drill bit 335 is inserted into the bore tapered first portion 317 with the drill bit keyway 339 aligned with and slidably receiving the key 331. The tapered shank 337 is inserted into the bore tapered first portion 317 until a tight, mutually opposing engagement is effected by the respective tapers of the bore first portion 317 and the drill bit tapered shank 337, with the adaptor front end 324 in spaced relationship with respect to the drill bit rear end 341. The cooperating tapered configurations of the bore first portion 317 and the shank 337 aligns the drill bit 335 coaxially with the rotary axis of the electric drill 302.

The key positioned within the keyways 330 and 339 provides a positive engagement between the tool holder body member 305 and the drill bit 335 whereby relative rotation therebetween is prevented. The magnet function of key 331 retains the ferromagnetic tapered shank 337 within the bore first tapered portion 317 and facilitates easy removal of the drill bit 335 from the tool holder 301.

Key 331, of course, serves the usual purpose denoted by that word with respect to the prevention of relative rotation. For present purposes, however, it also has to exhibit sufficient magnetic strength to hold the tool firmly with the shank securely seated in a manner and in amount of magnetic attraction sufficient to maintain alignment of the tool on the rotary axis in the presence of lateral forces imposed against the tool. Considering the combination of at least generally conical seating and at least one face-to-face engagement for the purpose of preventing relative rotation, attention must be directed to the attainment of sufficient shear or sluffing strength and sufficient magnetic strength to retain the tool in place.

It has been determined that key 331 should be at least seven equivalent diameters long in terms of its cross-sectional area in order to hold the tool in place. That is, the key is sized at the outset to present adequate shear or similar strength to perform its mechanical task. It then must be selected as to length in order to exhibit sufficient magnetic strength to hold the tool in place. A magnet material such as Alnico 8 well serves the purpose. Whatever material is chosen for key 331, it cannot be so soft as to shear or sluff, it cannot be so brittle as to crack and it must have a degree of magnetic retentivity and be so sized as to retain the shank face(s) tightly against the bore face(s).

Although twist-type drill bits have been shown for attachment to electric drills by tool holders embodying the present invention, it will be appreciated that a variety of other rotating tools may be attached to drills, drill presses and the like by tool holders embodying the present invention. Without limitation to the generality of useful devices, such rotary tools may include other types of drill bits, sanding discs, grinding wheels and the like.

Turning now to FIGS. 8–10, a fifth embodiment of the quick-release rotary tool system of the present invention is disclosed. Tool system 400 includes generally tool holder 402 and tool bit assembly 404. The inner end 406 of tool holder 402 includes a threaded bore 408 for mounting either to a threaded spindle as disclosed in FIG. 1 or an adaptor 410 of FIG. 8. Tool holder 402 includes a tapered bore 412 coaxial with threaded bore 408.

Tool bit assembly 404 includes a base 414 having the same taper as bore 412 for mating engagement therein. Assembly 404 also includes a drill bit 416 having a cutting edge 418 and a shank 420. The shank is mounted within a coaxial bore in base 414 and secured therein such as by brazing. A complementary key 422 and keyway 424 are formed into bore 412 of tool holder 402 and into base 414 of drill bit assembly 414 respectively. The sides of the key and keyway provide driving and driven surfaces 423 and 425 respectively by which tool holder 402 rotationally drives tool bit assembly 404.

A latch plate 430 is mounted within a slot 432 at the outer end 434 of tool holder 404. Slot 432 is arranged so that latch plate 430 pivots about a pivot pin 436 in a plane perpendicular to a central rotary axis 438, that is, a radial plane. Base 414 includes a slot 426, formed along a radial plane, into which the inner edge 428 of latch plate 430 seats when base 414 is substantially fully engaged within bore 412. Latch plate 430 is biased towards central axis 438 into the locked position of FIG. 9 by a flat coil spring 440. Spring 440, mounted between a wall 439 of slot 432 and a cut-out portion 442 of latch plate 430, tries to uncoil thus pivoting plate 430 about pin 436 in the direction of arrow 443. A finger recess 445 in outer end 434 allows user access to a pin 444 extending from one end of plate 430.

The user mounts tool bit assembly 404 within bore 412 by first aligning key 422 and keyway 424 and then pushing base 414 into the bore until latch plate 430 snaps into slot 426. Slot 426 is located so that this occurs when the surface of base 414 is in substantial mating engagement within bore 412. Assembly 404 is removed by pivoting latch plate 430 in the direction of arrow 447 using pin 444 and withdrawing base 414 from base 412.

FIG. 11 shows an alternative embodiment for base 414. In lieu of brazing a drill bit to the base, a set screw 446 is used to lock a drill bit within a base 448. Two set screws may be provided, one as a back up; however typically only one will be used to lock the drill bit in place.

At FIG. 12 a sixth embodiment of the invention is disclosed. A tool holder 450 is shown mounted to an adaptor 410. Tool holder 450 is similar to tool holder 402 but rather than using a spring 440 to bias latch plate 430 inwardly, a detent assembly 452, mounted axially within tool holder 450, is used to secure the latch plate into its locked position. For this purpose the latch plate is provided with a detent or cavity positioned to allow the ball 454 of detent assembly 452 to seat within the detent to lock the latch plate in place. Also, a set screw 456 is used to lock adaptor 410 within tool holder 450. This is useful when the tool, such as a drill bit, must be rotated in reverse to be removed from the workpiece.

While the illustrated embodiments disclose various combinations of means for attaching the tool holders to electric drills and means for attaching the drill bits to the tool holders, other such combinations are within the scope of the present invention. For example, a key and keyway arrangement as shown in the fourth embodiment (FIGS. 6 and 7) could similarly utilize a detent assembly as shown in the three previously described embodiments (FIGS. 1–5). Also a non-threaded adaptor such as that shown in the third embodiment for use with reversible drills could be utilized in conjunction with the magnet key and keyway arrangement disclosed in the fourth embodiment of the present invention.

As illustrated, the tool to be operated is a one-piece drill bit. As indicated, it may take other forms such as any one of a circular saw, screwdriver, reamer, router, grinder, buffer or other material modifying or working device.

Each embodiment of FIGS. 1–7 has employed a shank taper of about five degrees. The taper of the base of FIGS. 8 and 11 is about eight degrees. The taper should be no less than about two degrees, so as to insure secure seating of the shank within the bore of the holder. On the other hand, too severe a taper reduces stability of the seating of the tool as against a tendency to wiggle. Empirically, a maximum of about ten degrees is indicated.

In the earlier embodiments, a hexagonal cross-section has been specifically described. However, the number of sides in the polygonal configuration may be changed, and that need not be a polygon that defines chords of equal length. In principle, only one flat face, or the equivalent in terms of seating interengagement, is needed to resist relative rotation of the tool with respect to the holder. Moreover, that face may be a facet on a polygon, a radial wall of keyway or key, a surface of intermediate orientation or some combination of such features.

I claim:
1. A quick-release rotary tool system for use with rotary drive comprising:
 a tool holder having inner and outer ends and an outwardly tapering conical central bore surface defining a central axis;
 adaptor means for coupling said tool holder to the rotary drive for rotation of the tool holder about said central axis;
 a tool bit assembly including a cutting edge and a base end, said base end having a conical base surface configured for complementary engagement with said central bore surface;
 said base surface and said central bore surface including complementary drive surface portions to transmit drive forces between said tool bit assembly and said tool holder, said base surfae of said base end including a recessed portion therein;
 quick-release means for axially releasably securing the base end of said tool bit assembly within the central bore defined by said central bore surface, said quick-release means including a latch plate having first and second ends and being pivotally mounted to said tool holder for movement in a radial plane about a pivot pin at said first end between a released position and a locked position, said latch plate positioned so that an inner edge thereof engages the recessed portion of said base end when said base end is substantially fully mounted within said central bore and said latch plate is in said locked position;

means for biasing the inner edge of said latch plate toward said locked position;

said latch plate including an axially extending release pin at said second end of said latch plate; and said tool holder including a finger recess for providing access to said release pin when said latch plate is in said locked position to allow a user to pivot said latch plate from said latched position toward said released position to allow said tool bit assembly to be removed from said tool holder.

* * * * *